United States Patent [19]
Rolin et al.

[11] Patent Number: 5,559,814
[45] Date of Patent: Sep. 24, 1996

[54] VERIFICATION OF INTEGRITY OF DATA EXCHANGED BETWEEN TWO TELECOMMUNICATION NETWORK STATIONS

[75] Inventors: Pierre Rolin, Cesson Sevigne; Sylvain Gombault; Laurent Toutain, both of Rennes, all of France

[73] Assignee: France Telecom, Paris, France

[21] Appl. No.: 398,766

[22] Filed: Mar. 6, 1995

[30] Foreign Application Priority Data

Mar. 11, 1994 [FR] France ................................. 94 02964

[51] Int. Cl.$^6$ ....................................................... G06F 11/34
[52] U.S. Cl. ............................................ 371/67.1; 395/186
[58] Field of Search .................................. 371/67.1, 68.2, 371/48, 20.1; 380/37, 42, 26, 19, 4, 1, 49, 20, 21, 75; 395/186, 187.01, 182.16; 379/67; 342/44, 46; 250/341.11

[56] References Cited

U.S. PATENT DOCUMENTS 5,251,258 10/1993 Tanaka ...................................... 380/21
5,309,516 5/1994 Takaragi et al. ......................... 380/45
5,440,631 8/1995 Akiyama et al. ........................ 380/4
5,475,758 12/1995 Kikuchi .................................. 380/25

Primary Examiner—Robert W. Beausoliel, Jr.
Assistant Examiner—Phung My Chung
Attorney, Agent, or Firm—Jacobson, Price, Holman & Stern, PLLC

[57] ABSTRACT

The invention provides a method of verifying the integrity of sequences of data transmitted from a first station to a second station in a broadcast network during a call set up between the first and second stations. First and second encipherment seals are calculated in a control station separate from and independent of the first and second stations, respectively in response to reception of a sequence corresponding to the transmitted data sequence and in response to reception of the sequence which is received in and retransmitted by the second station. A comparison of the calculated seals for integrity verification is preceded in the control station by searching for the first seal calculated according to an identification word of the sequence which is retransmitted by the second station. The invention relates to a method of verifying the integrity of data sequences exchanged between stations respectively belonging to different broadcast networks.

6 Claims, 4 Drawing Sheets

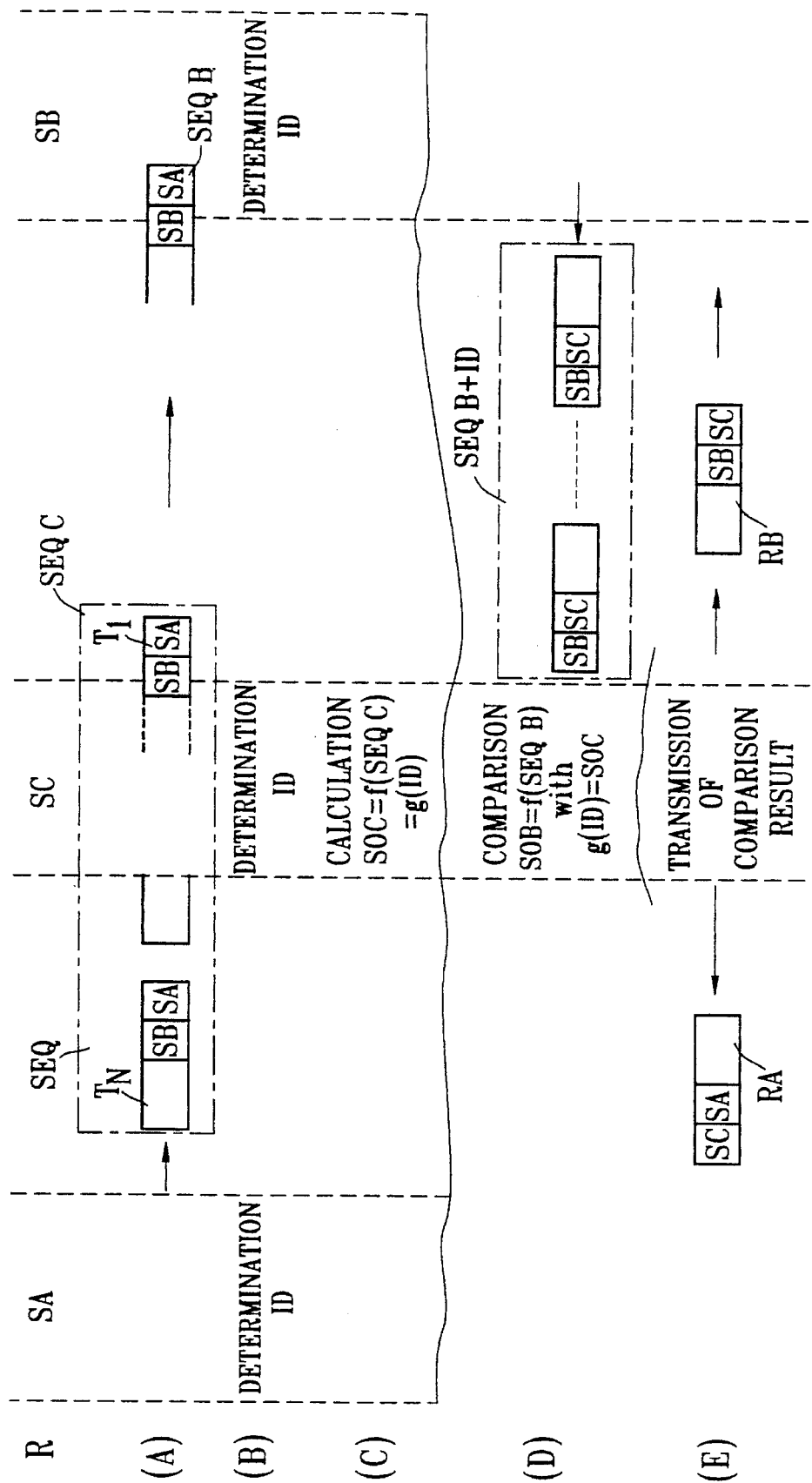

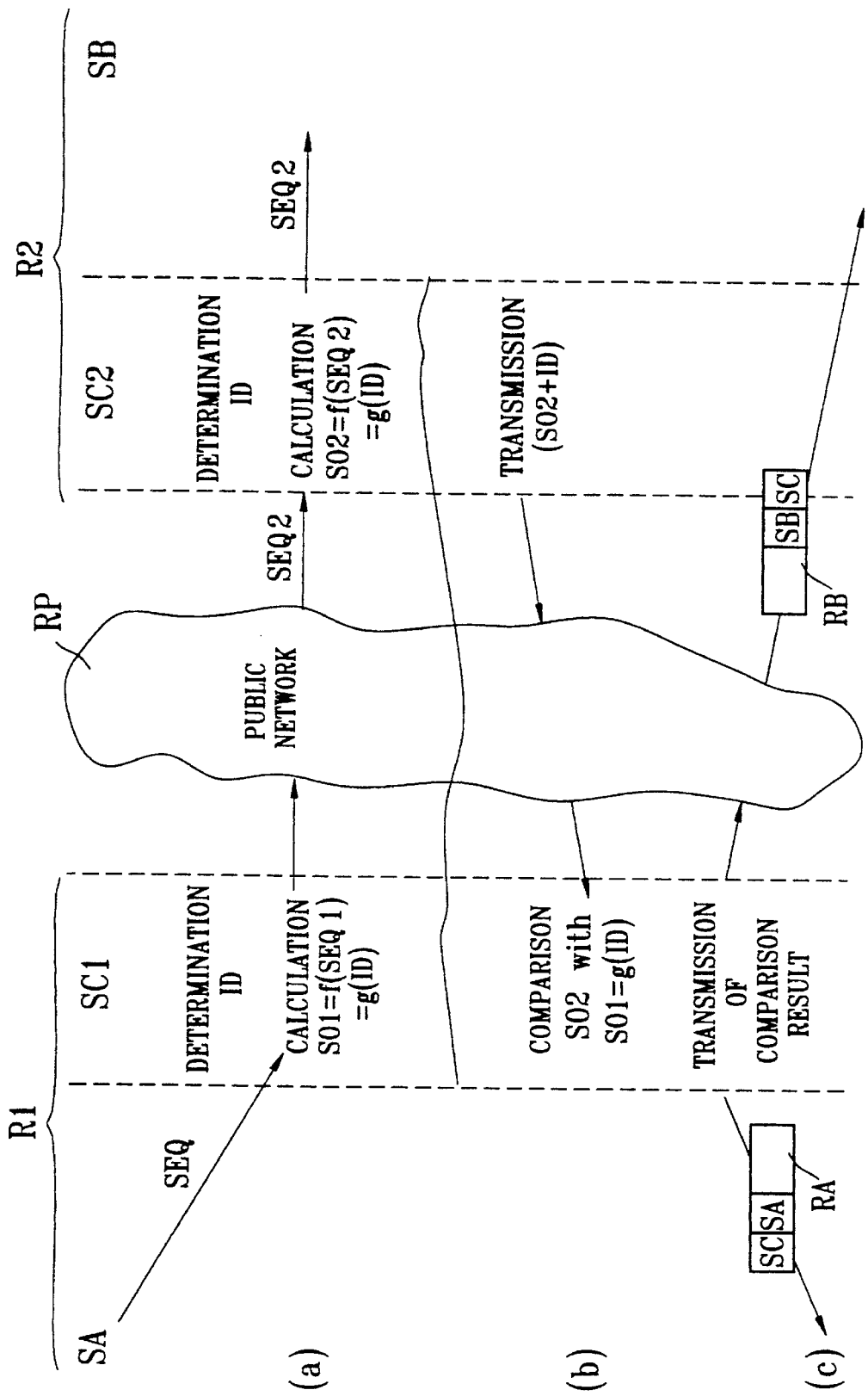

VERIFICATION OF INTEGRITY OF DATA EXCHANGED BETWEEN TWO TELECOMMUNICATION NETWORK STATIONS

BACKGROUND OF THE INVENTION

1. Field of the Invention

The present invention is generally concerned with the protection and security of telecommunication networks, in particular local area networks (LAN). The invention is more particularly concerned with verifying the integrity of data exchanged between two telecommunication stations.

2. Description of the Prior Art

The growth in "electronic data interchange" between companies has led local area network administrators to draw up a policy on security and protection for such communications directed to detecting any alteration of the data exchanged. This alteration may be accidental or the result of "hacking" by an ill-intentioned third party. Much more easily and much less detectably than in the transmission of information between persons by mail, electronic data transmission between users entails the possibility of alteration, such as loss, modification, insertion or deletion of data, due either to transmission errors or to intentional falsification.

It is relatively easy for an ill-intentioned third party to falsify data transmitted between two user stations. For example, it entails the fraudulent connection of processing means in series with the link connecting the two stations between which data is exchanged, giving the processing means characteristics, such as the network address, etc., of determined one of the two stations. Configured in this way, the processing means receives all the data traffic addressed to the determined station and modifies this data traffic, retransmitting a falsified traffic to the determined station.

A prior art method for verifying the integrity of data exchanged between two stations will now be described with reference to FIG. 1 and 2. FIG. 1 shows two local area networks R1 and R2 connected by a public network RP. The networks R1 and R2 respectively comprise four stations S10 through S13 and three stations S20 through S22, for example, and have a ring type topology and a bus type topology, respectively. The networks R1 and R2 are interconnected via the public network RP by two routers, also called gateways, RO1 and RO2 associated with the networks R1 and R2, respectively.

As shown in FIG. 2, each station in either of the networks R1 and R2, such as station S10, is defined in accordance with the OSI (Open Systems Interconnection) reference model of the ISO (International Standardization Organization) by a plurality of telecommunication protocol layers called the PHYSICAL, LINK, NETWORK, TRANSPORT, SESSION, PRESENTATION and APPLICATION layers. To connect the station S10 to the network R1, the station S10 has an electrical, optical or possibly even radio frequency (in the case of radio links) interface IN providing the physical link between the station S10 and a communication medium SU defining the topology of the network R1.

In the prior art technique, the implementation of an integrity verification procedure is directly dependent on the application element APPLICATION with which said procedure coexists. As shown in FIG. 2, this leads to the integration of an integrity verification module VER into the software or application means APPLICATION. In practise the integrity verification module VER can be incorporated into an external component which is invoked by the application means. Verification of the integrity of data exchanged between two stations, such as station S10 of network R1 and station S20 of network R2, both including compatible integrity verification modules in their APPLICATION layer, is carried out in the following manner.

When a station, for example the station S10, is ready to transmit a sequence of data that may comprise a frame or a group of frames to the other station, i.e. station S20 in this example, the station S10 first calculates, or has calculated by the external component, a first encipherment seal as a function of the sequence of data to be transmitted by using an encipherment algorithm. The first seal calculated is then transmitted with the sequence to the station S20. On receiving said first seal and a received sequence corresponding to the sequence transmitted over the public network RP, the station S20 calculates a second seal from the received sequence by using an encipherment algorithm identical to the encipherment algorithm used in the station S10. The calculated second seal is compared with the first seal as received in the station S20. A positive comparison of the seals indicates that the integrity of the data transmitted in the sequence has been preserved. Conversely, a negative comparison of the seals tells the station S20 that the original data transmitted by the station S10 has been modified. The negative comparison can trigger an alert to warn the station S20 user, or such as an attack on the integrity of the data can be identified, as far as the corresponding link, the source and destination stations, etc. are concerned, and be stored in a security file at the station S20 for subsequent analysis.

This integrity verification according to the prior art technique is restricted to applications for which such verification is provided. In data processing terms, it is not possible to verify the integrity of data transmitted and received by an application layer which has no integrity verification module VER.

OBJECT OF THE INVENTION

The main object of this invention is to provide integrity verification methods, in particular for use in local area networks, whereby the integrity verification is independent of the application layer and can therefore be applied to any exchange of data, in connection or no-connection mode, without requiring the development of a specific integrity verification module for each application.

SUMMARY OF THE INVENTION

According to a first embodiment, there is provided a method of verifying the integrity of data sequences transmitted from a first application means in a first station to a second application means in a second station in a network during an exchange of data between the first station and second station.

This first method comprises for each transmitted data sequence the steps of:

calculating a first encipherment seal in a control means separate from and independent of the first application means and second application means, in response to reception of a received sequence corresponding to the transmitted data sequence from the first application means, writing the first encipherment seal in a correspondence table stored in the control means at an address equal to a first identification word of the received sequence corresponding to the transmitted sequence, calculating in the control means a second encipherment seal in response to reception of a sequence retransmitted by the second application means and received by the second application means and corresponding to the transmitted data sequence, reading the first encipherment seal in the correspondence table as a function of a second identification word of the sequence retransmitted by the second application means, and comparing in the control means the read first encipherment seal and the calculated second encipherment seal to detect any alteration of the sequence received by the second application means in comparison with the transmitted data sequence.

Preferably, at the comparison step is followed by transmission of a comparison result from the control means to the first and second stations, in particular in the event of a negative comparison result.

The variant defined above concerns only integrity verification for exchanges of data between two stations on the same network. The invention also covers verification of the integrity of data exchanged between application means implemented on stations on different networks.

According to a second embodiment, there is provided a method of verifying the integrity of data sequences transmitted from a first application means in a first station of a first broadcast network to a second application means in a second station of a second broadcast network during an exchange of data between the first station and second station. This second method comprises for each transmitted data sequence the steps of:

in a first control means belonging to the first broadcast network and separate from the first application means, calculating a first encipherment seal in response to a reception of a first sequence corresponding to the transmitted data sequence means, in a second control means belonging to the second broadcast network and separate from the second application means, calculating a second encipherment seal in response to reception of a second sequence corresponding to the transmitted data sequence, writing one of the first encipherment seal and second encipherment seal in a correspondence table stored in respective one of the first control means and second control means, in which the one of the first encipherment seal and second encipherment seal is calculated, at one address equal to a first identification word of respective one of the first sequence and second sequence, transmitting the other of the first encipherment seal and second encipherment seal and a second identification word of the other of the first sequence and second sequence from the other of the first control means and second control means to the one of the first control means and second control means, reading the one of the first encipherment seal and second encipherment seal in the correspondence table in response to the first identification word, and in the one of the first control means and second control means, comparing the one of the first encipherment seal and second encipherment seal read in the correspondence table with the other of the first encipherment seal and second encipherment seal to detect any alteration of a sequence received by the second application means and corresponding to the transmitted sequence in comparison with the transmitted data sequence.

The result of the comparison can be transmitted by one of the first and second control means to each of the first and second application means.

According to the above method embodiment, the first and second control means are respectively included in routers or gateways of the first and second broadcast networks. According to another embodiment of the invention, a control means is included in a station of a broadcast network.

BRIEF DESCRIPTION OF THE DRAWINGS

The foregoing and other objects, features and advantages of the present invention will be apparent from the following detailed description of several preferred embodiments of the invention with reference to the corresponding accompanying drawings in which:

FIGS. 4A and 4B are respectively timing diagrams illustrating steps of the integrity verification method embodying the invention for data exchanged between two respective applications implemented at two stations on the same network and for data exchanged between two applications implemented on two stations in different networks.

DESCRIPTION OF THE PREFERRED EMBODIMENTS

Figure 1:
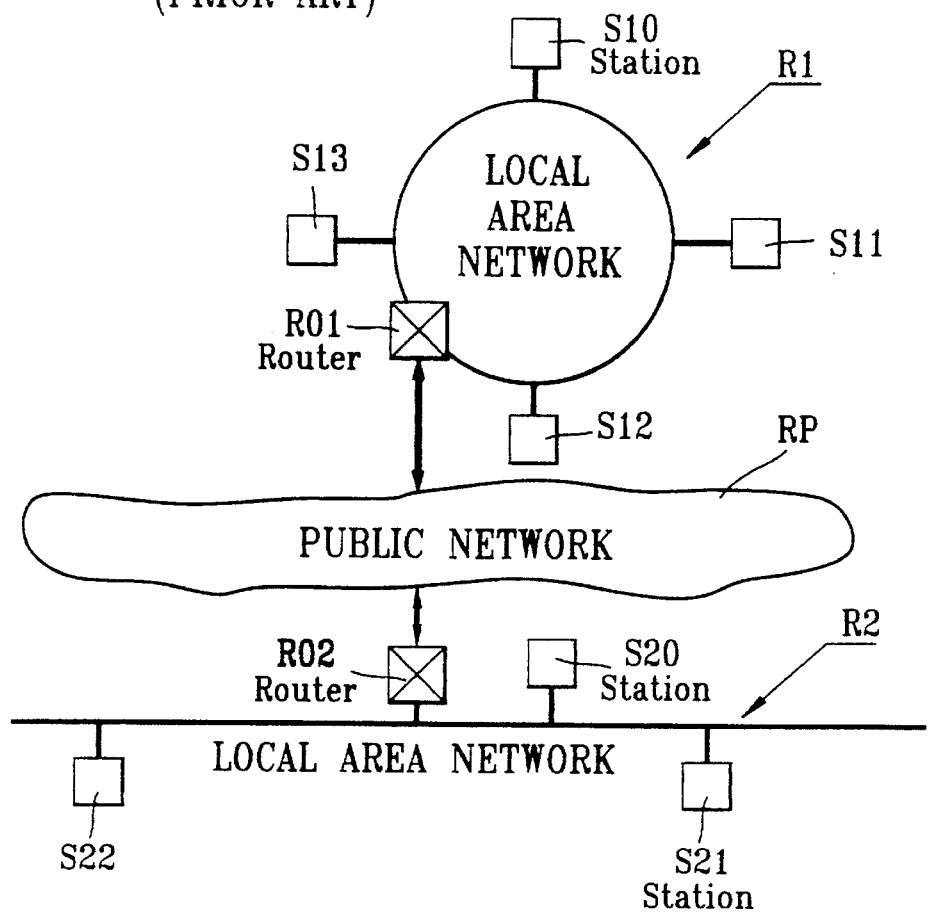
FIG. 1, already commented on, is a block diagram of two local area networks interconnected via a public network using the prior art technique.
Figure 3:
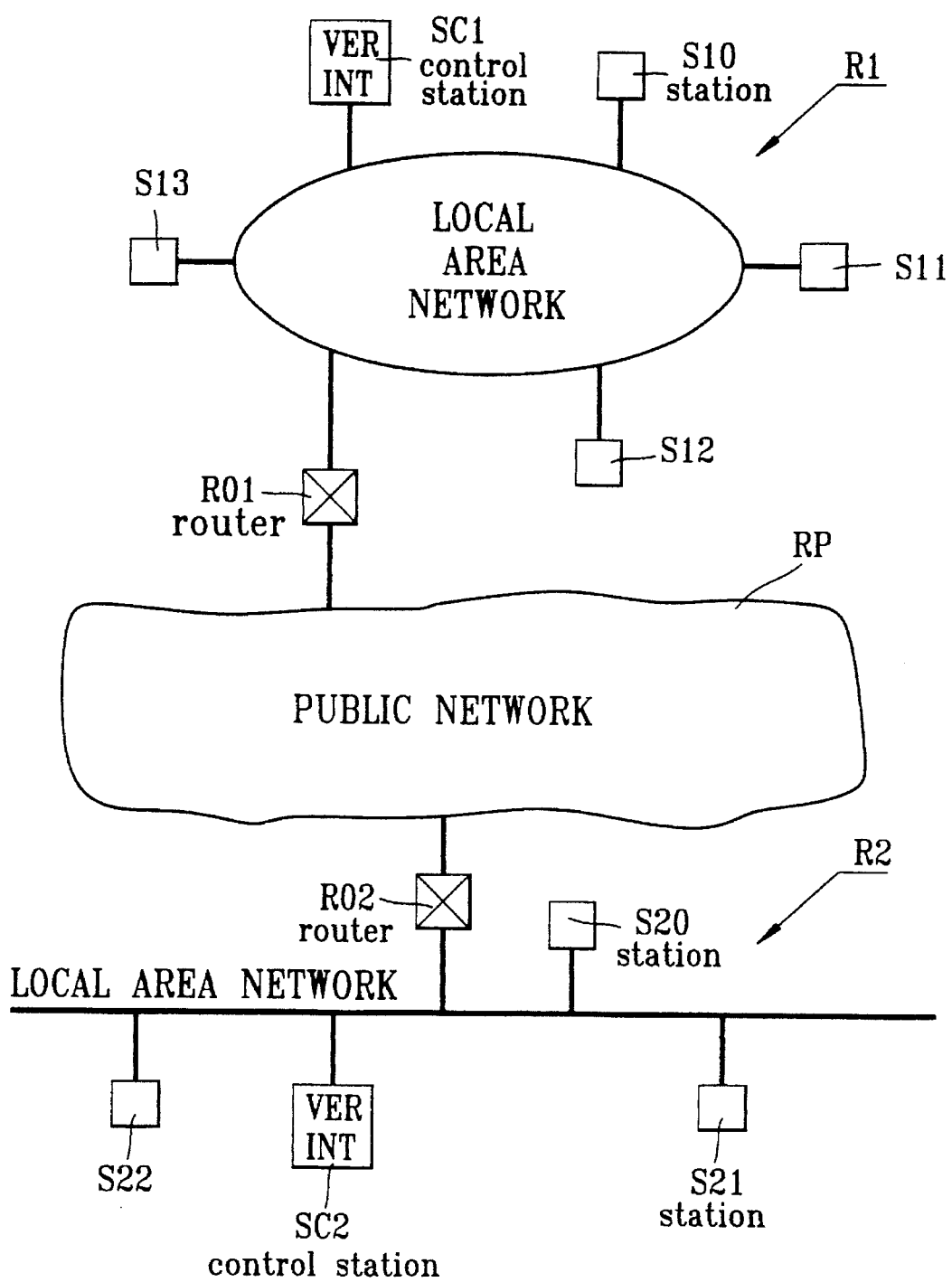
FIG. 3 is a block diagram analogous to FIG. 1 showing two local area networks of the invention each including a control station independent of thither stations.

FIG. 3 shows two local area networks R1 and R2 each including a respective control station SC1, SC2 separate from and independent of the other stations S10–S13 of network R1 and S20–S22 of network R2. As in the FIG. 1 example, the two networks R1 and R2 are interconnected via the public network RP. Each network R1, R2 is connected to the public network RP by a respective router RO1, RO2. Each control station SC1, SC2 implements functions relating to integrity verification for each exchange of data, in connection mode or in no-connection mode, with at least one of the stations S10–S13, S20–S22 in the respective network R1, R2. The control station SC1 ensures, on the one hand, the verification of the integrity of data exchanged between two stations in the respective network R1 and, on the other hand, the verification of the integrity of data exchanged between one of the stations in the respective network R1 and any other station in any other network, such as the station S20 in the network R2.

These two modes of integrity verification are called intra-domain integrity verification and inter-domain integrity verification as they respectively concern a single network and two networks, and are described in more detail below with reference to FIGS. 4A and 4B.

Figure 2:
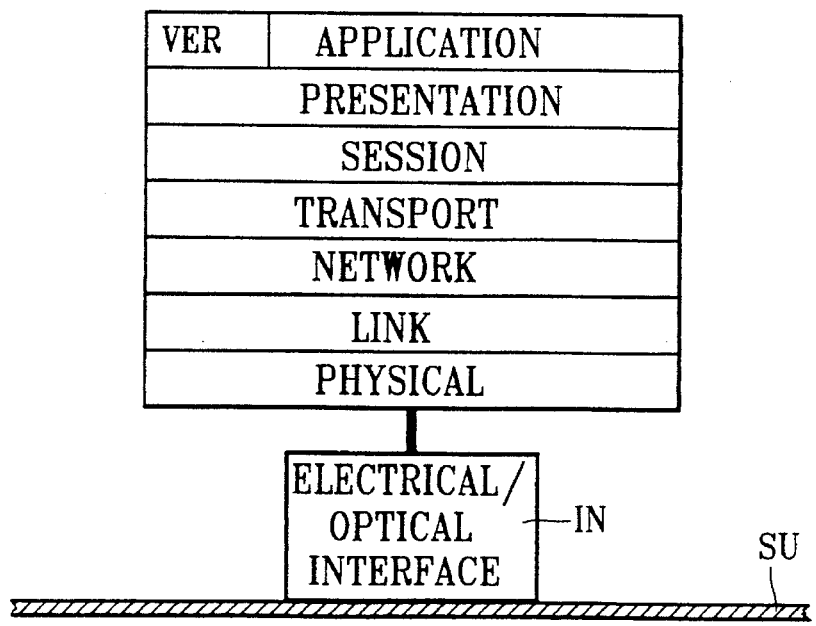
FIG. 2, also already commented on, shows means for implementing a communication application with integrity verification in a station of one of the local area networks from FIG. 1.

The fundamental difference characterizing a network of the invention in comparison with the prior art technique should be noted. A station called the control station SC1, SC2, implements integrity verification functions for any exchange of data from or to any application implemented on any station in the respective network, by contrast with the specific development of an integrity verification module VER (FIG. 2) included in or invoked by the APPLICATION layer in at least one station in respect of which this procedure according to the prior art technique is required.

FIG. 4A illustrates steps of the method of the invention for an intra-domain integrity verification mode, i.e. relating to exchanges of data between respective applications APPLICATION implemented at two stations of the same network R1 or R2.

The following description of FIG. 4A assumes that the integrity of the data is verified in a control station, denoted SC, of said same network, denoted R, and that the integrity verification concerns an exchange of data between two stations SA and SB of the network R. It is further assumed that the network R of which the stations SA, SB and SC are part has the broadcast property. This broadcast property characterizes the fact that an information element such as a frame transmitted by one station is broadcast throughout the communication medium, cable or optical fiber, constituting the topology of said network, and is potentially accessible to all other stations in the network R. This broadcast property is a feature of all local area networks, including point-to-point and point-to-multipoint networks. Note that in the context of this disclosure the term "frame" refers to the concept of PDU (Protocol Data Unit), packet, message, etc., depending on the protocol employed.

The method of the invention is applied to an elementary data unit called as a "sequence". A sequence may comprise a frame or a packet transmitted during an exchange of data, or a given number N of successive frames $T_1$ through $T_N$ in the data exchanged as shown at the step A in FIG. 4A, or a portion of a frame. A particular sequence is associated with an identification word identifying the sequence in a univocal way. Given that a sequence defines for example a frame or a series of frames transmitted between two stations during an exchange of data, the sequence identification word can comprise first and second identification word portions identifying the sequence in a univocal way. The first identification word portion identifies the exchange of data, for example on the basis of the time the call was set up for an exchange of data in connection mode, the addresses of the source and destination stations for the exchange of data, etc. and the second identification word portion indicates the rank (sequence number) of the sequence in the exchange of data. Other known sequence identifying elements can be included in the identification word.

The steps of the method illustrated in FIG. 4A will now be described in detail. When a data sequence SEQ is transmitted from a first application APPLICATION in the first station SA to a second application APPLICATION in the second station SB, given the broadcast properties of the network to which the stations SA, SB and SC belong, this sequence SEQ is received by the control station SC (step A). The application APPLICATION in the sending station SA, the application APPLICATION in the receiving station SB and the station SC each determine the same word ID identifying the transmitted sequence SEQ in a univocal way (step B). In practise the applications in the station SB, respectively the station SC, determine the identification word ID from a received sequence SEQB, respectively SEQC, which may differ from the transmitted sequence SEQ because the sequence is possibly altered on transmission over the communication medium SU of the network R. In addition to determination of the identification word ID, a first seal SOC is calculated in the control station SC (step C) on the basis of the sequence SEQC received by the control station SC and using an encipherment algorithm f, i.e.:

$$SOC=f(SEQC).$$

This first seal is associated with the identification word ID of the sequence by writing it in a correspondence table stored in the station SC by the equation:

$$SOC=g(ID)$$

After the application APPLICATION in the second station SB receives a sequence SEQB corresponding to the sequence SEQ, and at the initiative of this application in the second station, an integrity verification is started in respect of the sequence SEQB (step D). The integrity verification is started as a result of transmission, by the station SB to the station SC, of the received sequence SEQB and the identification word ID of said sequence SEQB received by the application APPLICATION in the station SB. The control station SC calculates a second encipherment seal SOB on the basis of the sequence SEQB and using the encipherment algorithm f, and looks for the first seal SOC previously calculated by read-addressing the correspondance table with the identification word ID transmitted by the application in the station SB. The station SC then compares the two seals SOC and SOB which are respectively read and calculated. A positive comparison of the seals indicates that the integrity of the transmitted data sequence SEQ has been preserved. Otherwise the sequence SEQB received by the second station SB has undoubtedly been modified compared to that SEQ transmitted by the application APPLICATION in the first station SA.

The control station SC preferably transmits to the applications APPLICATION in the stations SA and SB respective frames RA and RB including the result of said comparison (step E). As shown in FIG. 4A, each of the frames RA and RB has two fields including the network addresses of the respective corresponding source and destination stations. Note that the meaning of the term "address" encompasses the concepts of SAP (Service Access Point), port, etc. depending on the protocols used in the stations.

An inter-domain integrity verification method relating to data exchanged between two applications APPLICATION of two respective stations, denoted SA and SB, belonging to two respective broadcast networks R1 and R2 connected by a public network RP will now be described in detail with reference to FIG. 4B. In this embodiment of the invention the networks R1 and R2 include respective control stations denoted SC1 and SC2.

When the application APPLICATION in the first station SA transmits a data sequence SEQ to the application APPLICATION in the second station SB, this sequence SEQ is first broadcast in the network R1 to which the station SA belongs before it is routed to the station SB via the public network RP. When the control station SC1 receives a sequence SEQ1 corresponding to this sequence SEQ, the station SC1 determines an identification word ID for the sequence SEQ1 on the basis of criteria identical to those explained previously (time of call set-up between stations SA and SB, rank (sequence number) of the sequence in the call, etc.). Following determination of the word ID, a first sequence encipherment seal SO1 is calculated (step a) as a function of the sequence SEQ1 received at the station SC1 using an encipherment algorithm f. The identification word ID is associated with the seal SO1 in a correspondence table stored in station SC1:

$$SO1=g(ID)$$

The sequence SEQ transmitted by the application APPLICATION of the first station SA of the first network R1 is received as a sequence SEQ2 by the second network R2 to which the second station SB belongs. In step b the control station SC2 in the second network R2, after determining the identification word ID, calculates a second seal SO2 on the basis of a received sequence SEQ2 corresponding to the transmitted sequence SEQ and using the same encryption algorithm f as was used in the station SC1.

Following these steps of determining the identification word ID and calculating the seals in the two control stations SC1 and SC2, comparison of the seals is instigated at the initiative of either of the control stations (step b). In the situation shown in FIG. 4B the second control station SC2 takes this initiative by transmitting the calculated seal SO2 and the identification word ID of the corresponding sequence to the station SC1.

The word ID and the seal SO2 are received by the first control station SC1 which compares the seal SO2 which station SC1 has received and the corresponding seal SO1 which station SC1 previously calculated and which is read in the corresponding table at an address equal to the received identification word ID transmitted from the station SC2. A negative comparison indicates that the sequence SEQ2 has been altered in comparison with the sequence SEQ=SEQ1. Otherwise, it follows that the sequence SEQ is identical to the sequence SEQ2.

In step c in FIG. 4B the comparison result can be retransmitted by the station SC1 to the station SC2 and/or in the form of respective frames RA and RB to the applications APPLICATION in the stations SA and SB.

In this second embodiment shown in FIG. 4B the stations SC1 and SC2 can be respective routers, denoted RO1 and RO2 in FIG. 3, of the networks R1 and R2 to which the stations SA and SB belong. Each router RO1, RO2 constitutes an interface between the respective local area network R1, R2 and the public network and performs a protocol conversion for the low layer, typically PHYSICAL, LINK and NETWORK layers.

What we claim is:

1. A method of verifying the integrity of data sequences transmitted from a first application means in a first station to a second application means in a second station in a network during an exchange of data between said first station and second station, said method comprising for each transmitted data sequence the steps of:

calculating a first encipherment seal in a control means separate from and independent of said first application means and second application means, in response to reception of a received sequence corresponding to said transmitted data sequence from skid first application means, writing said first encipherment seal in a correspondence table stored in said control means at an address equal to a first identification word of said received sequence corresponding to said transmitted sequence, calculating in said control means a second encipherment seal in response to reception of a sequence retransmitted by said second application means and received by said second application means and corresponding to said transmitted data sequence, reading said first encipherment seal in said correspondence table as a function of a second identification word of said sequence retransmitted by said second application means, and comparing in said control means the read first encipherment seal and the calculated second encipherment seal to detect any alteration of said sequence received by said second application means in comparison with said transmitted data sequence.

2. The method according to claim 1 wherein said comparison step is followed by transmission of a comparison result from said control means to said first station and second station, in particular in the event of a negative comparison result.

3. The method according to claim 1 wherein said control means is included in a station of said network.

4. A method of verifying the integrity of data sequences transmitted from a first application means in a first station of a first broadcast network to a second application means in a second station of a second broadcast network during an exchange of data between said first station and second station, said method comprising for each transmitted data sequence the steps of:

in a first control means belonging to said first broadcast network and separate from said first application means, calculating a first encipherment seal in response to a reception of a first sequence corresponding to said transmitted data sequence, in a second control means belonging to said second broadcast network and separate from said second application means, calculating a second encipherment seal in response to reception of a second sequence corresponding to said transmitted data sequence, writing one of said first encipherment seal and second encipherment seal in a correspondence table stored in respective one of said first control means and second control means, in which said one of said first encipherment seal and second encipherment seal is calculated, at one address equal to a first identification word of respective one of said first sequence and second sequence, transmitting the other of said first encipherment seal and second encipherment seal and a second identification word of the other of said first sequence and second sequence from the other of said first control means and second control means to said one of said first control means and second control means, reading said one of said first encipherment seal and second encipherment seal in said correspondence table in response to said first identification word, and in said one of said first control means and second control means, comparing said one of said first encipherment seal and second encipherment seal read in said correspondence table with said other of said first encipherment seal and second encipherment seal to detect any alteration of a sequence received by said second application means and corresponding to said transmitted sequence in comparison with said transmitted data sequence.

5. The method according to claim 4 comprising a step of transmitting a result of said comparing step from said one of said first control means and second control means to said first application means and second application means.

6. The method according to claim 4 wherein said first control means and second control means are included in routers of said first broadcast network and second broadcast network, respectively.

* * * * *